(12) United States Patent
Pepe

(10) Patent No.: US 8,947,845 B2
(45) Date of Patent: Feb. 3, 2015

(54) SOLID STATE PROTECTOR MODULE

(71) Applicant: Tii Network Technologies, Inc., Edgewood, NY (US)

(72) Inventor: Raymond Pepe, Rocky Point, NY (US)

(73) Assignee: Tii Network Technologies, Inc., Edgewood, NY (US)

( * ) Notice: Subject to any disclaimer, the term of this patent is extended or adjusted under 35 U.S.C. 154(b) by 145 days.

(21) Appl. No.: 13/621,321

(22) Filed: Sep. 17, 2012

(65) Prior Publication Data

US 2013/0070383 A1 Mar. 21, 2013

Related U.S. Application Data

(60) Provisional application No. 61/627,054, filed on Sep. 16, 2011.

(51) Int. Cl.
*H02H 3/20* (2006.01)
*H04M 1/74* (2006.01)

(52) U.S. Cl.
CPC .............. *H02H 3/20* (2013.01); *H04M 1/745* (2013.01)

USPC .......................................................... 361/119

(58) Field of Classification Search
USPC .................................................... 361/119, 19
See application file for complete search history.

(56) References Cited

U.S. PATENT DOCUMENTS 4,733,325 A * 3/1988 Loesch ............................ 361/19
4,736,269 A * 4/1988 Amein et al. .................. 361/128

* cited by examiner

*Primary Examiner* — Rexford Barnie
*Assistant Examiner* — Angela Brooks
(74) *Attorney, Agent, or Firm* — Gerald T. Bodner

(57) ABSTRACT

A protector module for use with a communication system, such as a telephone system having a tip line and a ring line, includes a base member and a plurality of electrically conductive pins mounted on the base member. A first electrical contact is fixedly mounted on the top surface of the base member and is in electrical communication with one of the tip line and the ring line. A movable second electrical contact is connected to a ground pin mounted on the base member and is situated in alignment with the first electrical contact. A solder pellet, which may melt in high current, long duration power surges, and a solid state device, are positioned between the first and second electrical contacts.

14 Claims, 7 Drawing Sheets

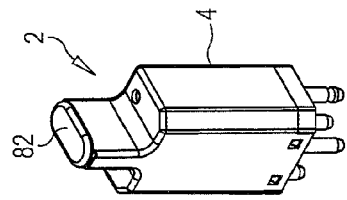
FIG. 11G
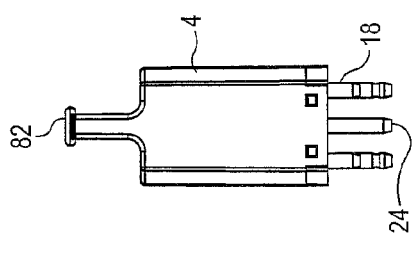
FIG. 11D  FIG. 11F  FIG. 11I
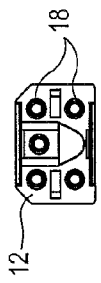
FIG. 11C
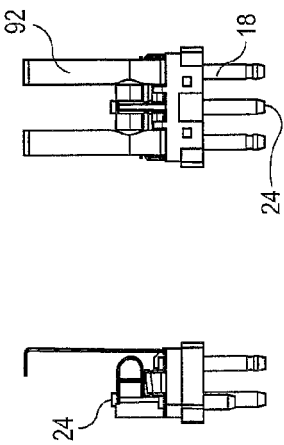
FIG. 11H
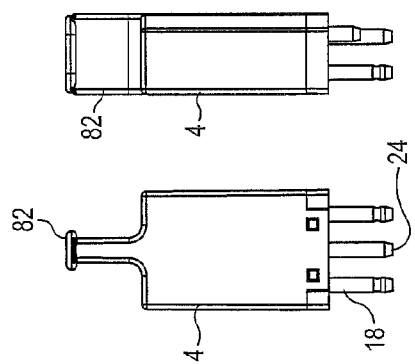
FIG. 11B  FIG. 11E
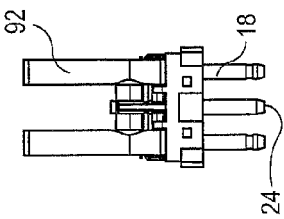
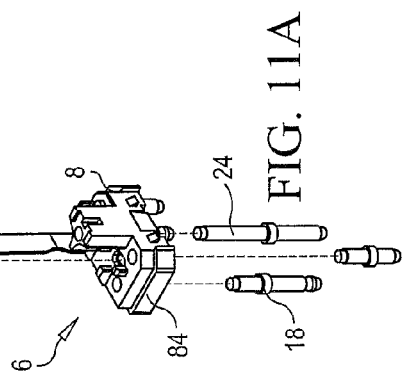
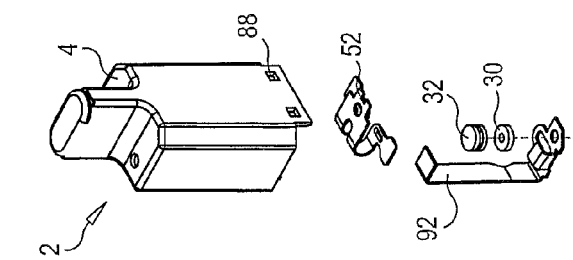
FIG. 11A

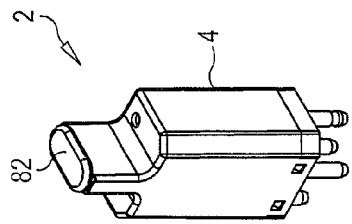
FIG. 12G
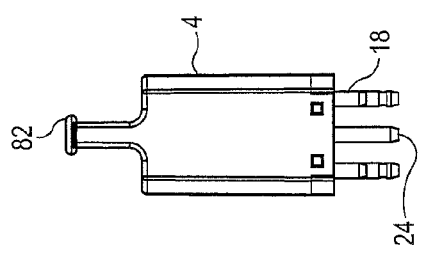
FIG. 12D  FIG. 12C  FIG. 12B
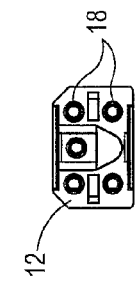
FIG. 12F
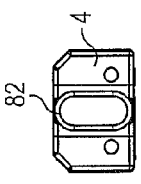
FIG. 12E
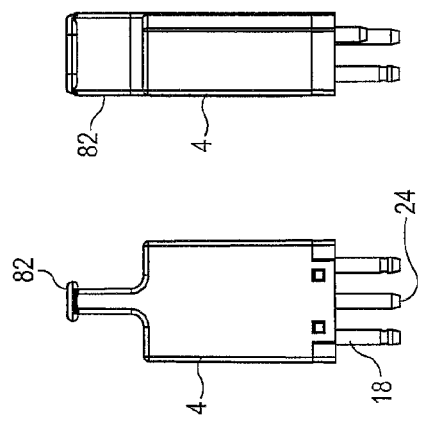
FIG. 12I  FIG. 12H
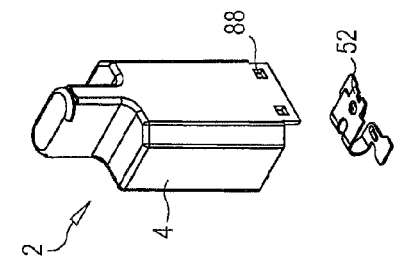
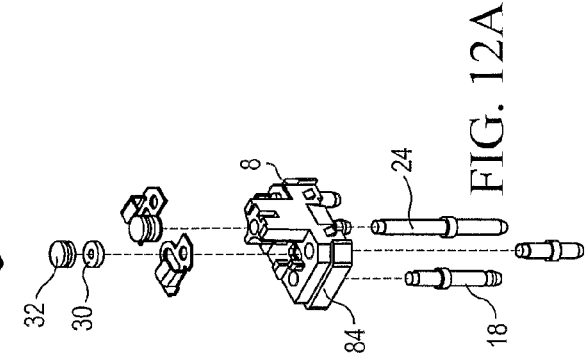
FIG. 12A

SOLID STATE PROTECTOR MODULE

CROSS-REFERENCE TO RELATED APPLICATIONS

This application is related to U.S. Provisional Application Ser. No. 61/627,054 filed on Sep. 16, 2011, and entitled "Solid State Protector Module", the disclosure of which is incorporated herein by reference and on which priority is hereby claimed.

BACKGROUND OF THE INVENTION

1. Field of the Invention

The present invention generally relates to protector modules for use with communication systems and more particularly relates to solid state protector modules.

2. Description of the Prior Art

Conventional power protection modules for use in communication systems are commonly inserted into connector blocks to protect communication lines from power surges. However, the conventional modules have many moving parts including mechanical springs that can make assembly difficult and cumbersome. Furthermore, in the event of a power surge, the complexities of the conventional protector modules often unduly delay the surge protection until after damage has already been done to the communications equipment connected thereto.

OBJECTS AND SUMMARY OF THE INVENTION

It is an object of the present invention to provide a protector module for use with a communication system which is relatively simple in structure, requiring relatively few components.

It is another object of the present invention to provide a protector module which is relatively easy to assemble.

It is still another object of the present invention to provide a protector module for use with a communication system in which a shorting contact requires relatively little movement to effect a failsafe grounding of the communication lines of the system.

It is a further object of the present invention to provide a protector module which uses an improved solder pellet design that facilitates the flow of melted solder therefrom.

It is still a further object of the present invention to provide a protector module which is structured to direct the flow of melted solder from a solder pellet used therein into a holding well so that the melted solder does not interfere with the operation of the protector module.

It is yet a further object of the present invention to provide a protector module which is structured to maximize the surface areas of shorting electrical contacts used therein which contact each other when the protector module is in a failsafe grounding mode.

It is another object of the present invention to provide a protector module which overcomes the inherent disadvantages of conventional protector modules.

The present invention provides a solid state protector module that contains relatively few parts making assembly easier. The present invention further contains fewer moving parts, allowing quicker surge protection and more efficient operation.

In accordance with one form of the present invention, a protector module for use with a communication system, such as a telephone system having a tip line and a ring line, includes a base member having a solder holding well formed in a top surface thereof, and a plurality of electrically conductive pins, including a ground pin, mounted on the base member. A first electrical contact is fixedly mounted on the top surface of the base member and is in electrical communication with one of the tip line and the ring line. A movable second electrical contact is connected to a ground pin mounted on the base member and is situated in alignment with the first electrical contact. A solder pellet, which may melt in high current, long duration power surges, and a solid state device, are positioned between the first and second electrical contacts.

The solder pellet and the solid state device bias the second electrical contact in a raised position such that it is not in electrical communication with the first electrical contact. The solid state device handles most power surges. However, during a prolonged power surge, the current passing through the solid state device and the solder pellet causes the solder pellet to melt and flow into the well formed in the top surface of the base member. With the solder pellet melted, the second electrical contact is no longer biased in a raised position above the first electrical contact, and the two contacts engage one another, causing the tip line or the ring line, or both, to be electrically connected to the ground pin.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 11A is an exploded perspective view of the protector module formed in accordance with the second embodiment of the present invention.

FIG. 11B is a front view of the protector module formed in accordance with the second embodiment of the present invention.

FIG. 11C is a side view of the protector module formed in accordance with the second embodiment of the present invention.

FIG. 11D is a rear view of the protector module formed in accordance with the second embodiment of the present invention.

FIG. 11E is a top view of the protector module formed in accordance with the second embodiment of the present invention.

FIG. 11F is a bottom view of the protector module formed in accordance with the second embodiment of the present invention.

FIG. 11G is a perspective view of the protector module formed in accordance with the second embodiment of the present invention.

FIG. 11H is a side view of the protector module formed in accordance with the second embodiment of the present invention, with the housing removed therefrom.

FIG. 11I is a front view of the protector module formed in accordance with the second embodiment of the present invention, with the housing removed therefrom.

FIG. 12A is an exploded perspective view of the protector module formed in accordance with the first embodiment of the present invention.

FIG. 12B is a front view of the protector module formed in accordance with the first embodiment of the present invention.

FIG. 12C is a side view of the protector module formed in accordance with the first embodiment of the present invention.

FIG. 12D is a rear view of the protector module formed in accordance with the first embodiment of the present invention.

FIG. 12E is a top view of the protector module formed in accordance with the first embodiment of the present invention.

FIG. 12F is a bottom view of the protector module formed in accordance with the first embodiment of the present invention.

FIG. 12G is a perspective view of the protector module formed in accordance with the first embodiment of the present invention.

FIG. 12H is a side view of the protector module formed in accordance with the first embodiment of the present invention, with the housing removed therefrom.

FIG. 12I is a front view of the protector module formed in accordance with the first embodiment of the present invention, with the housing removed therefrom.

DETAILED DESCRIPTION OF THE PREFERRED EMBODIMENTS

In accordance with a first embodiment of the present invention, a solid state protector module 2 includes a protective housing 4 that at least partially encloses a protector module assembly 6 which includes a base member 8. The base member 8 may be engaged with the housing 4 to encapsulate or at least partially enclose the protector module assembly 6.

Figure 1:
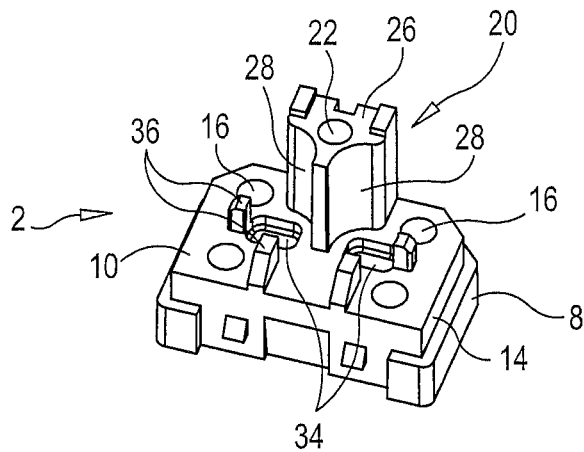
FIG. 1 is a front perspective view of the protector module formed in accordance with the present invention, showing the base member of the module prior to assembly.
Figure 2:
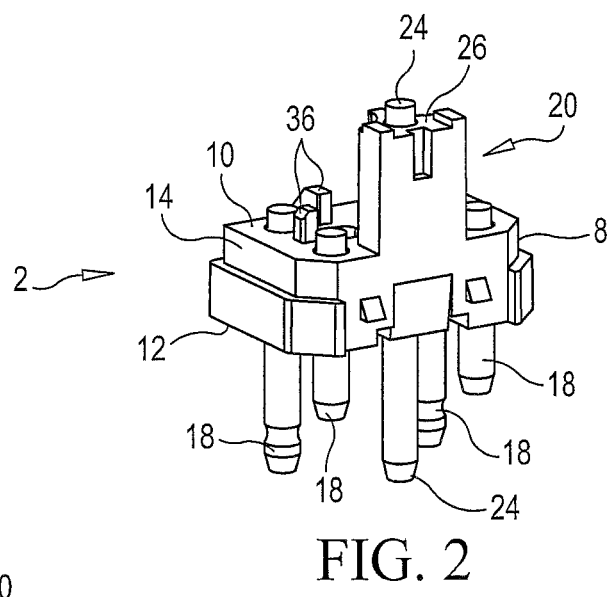
FIG. 2 is a back perspective view of the protector module formed in accordance with the present invention, showing the base member in a partially assembled state.

Initially referring to FIGS. 1 and 2 of the drawings, it will be seen that the base member 8 includes a top surface 10 and an oppositely disposed bottom surface 12, and an outer sidewall 14. A plurality of bores 16 formed through the thickness of the base member 8 and through the top surface 10 and bottom surface 12 of the base member 8 receives and anchors a plurality of conductive pins, specifically tip and ring conductive pin pairs 18, that extend at least partially above the top surface 10 of the base member 8, and below the bottom surface 12 of the base member 8. A ground conductor support 20 extends upwardly from the top surface 10 of the base member 8 and further includes a bore 22 formed therethrough and extending through the thickness of the base member 8 and both the top and bottom surfaces 10, 12 of the base member 8. The bore 22 may receive and anchor a ground conductor pin 24 that extends at least partially above a top surface 26 of the ground conductor support 20, and below the bottom surface 12 of the base member 8. The ground conductor support 20 further includes at least two generally curved sides 28 having a curvature that preferably matches the circumference of, and aligns with and helps guidingly support, a solder pellet 30 and solid state device 32 positioned on the top surface 10 of the base member 8, as will be described in the forthcoming paragraphs.

The base member 8 further includes a plurality, but preferably two, wells 34 formed in the top surface 10 thereof and into which melted solder from pellet 30 may flow in the event of a prolonged power surge, so that melted solder does not pool on the top surface 10 and interfere with the operation of the protector module. The wells 34 are preferably recessed at least partially into the top surface 10 of the base member 8 and aligned opposite the curved sides 28 of the ground conductor support 20, which align the solder pellets 30 on the top surface 10 of the base member 8 over the wells 34.

The base member 8 also includes a plurality of ribs 36 extending upwardly from its top surface 10 to further align and support the solder pellet 30 and solid state device 32 on the top surface 10 thereof. More specifically, the solder pellets 30 and solid state devices 32, both being generally cylindrical in shape, are inserted between, and guidingly supported by, the curved sides 28 of the ground conductor support 20 and the upwardly extending ribs 36. The wells 34 are recessed directly below the solder pellets 30 and solid state devices 32 so as to catch the liquid solder when the solder pellets 30 melt during a power surge.

Figure 3:
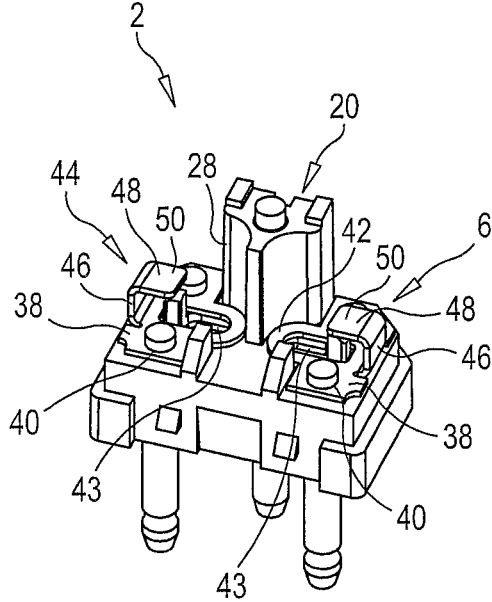
FIG. 3 is a front perspective view of the protector module formed in accordance with the present invention, showing fixed rectangular contacts of the protector module added to the base member.

The electrical contacts of protector module assembly 6 are fitted onto the base member 8 and provide surge protection to the communication lines connected to the conductor pins, specifically, the tip and ring lines connected to conductor pairs 18, extending through the base member 8. Referring to FIG. 3 of the drawings, it will be seen that the protector module 2 includes a pair of fixed, rectangular, electrically conductive contacts 38 positioned on opposite sides of the base member 8 with the ground conductor support 20 positioned therebetween. Each rectangular contact 38 is connected in series with one of the tip and ring conductor pairs 18 at opposite lateral sides of the base member 8. As can be seen in FIG. 3 of the drawings, the contacts 38 include a plurality of bores 40, preferably two, that are aligned with and receive the upper ends of the tip and ring pins of the conductive pairs 18 extending partially through and above the top surface 10 of the base member 8. The contacts 38 may further be aligned with and supported or guided by the ribs 36 extending from the top surface 10 of the base member 8 for particular positioning on the top surface.

Each contact 38 further includes a curved lower contact portion 42 extending inwardly along the top surface 10 of the base member 8. The lower contact portion 42 includes an oval opening 43 formed through the thickness thereof and which is in alignment with a respective similarly oval-shaped solder well 34 formed in the base member 8. As can be seen in FIG. 5A of the drawings, the solder pellets 30 and solid state devices 32 situated thereon are stacked on top of each lower contact portion 42 over the oval openings 43 so that the melted solder is directed by the lower contact portions 42 through the oval openings 43 and into the wells 34.

Also extending from each contact 38 is a raised, upper contact portion 44. More specifically, each upper contact portion 44 includes a first segment 46 that extends upwardly and perpendicularly from the lower contact portion 42, and a second segment 48 that extends inwardly of the base member 8 from the first segment 46 over the lower contact portion 42. The second segment 48 includes an angled top surface 50 that may be engaged by a movable shorting contact 52 in electrical communication with the ground conductor pin 24 extending from the ground conductor support 20 during a prolonged power surge to short the ring and tip conductor pairs 18 to ground.

Figure 5:
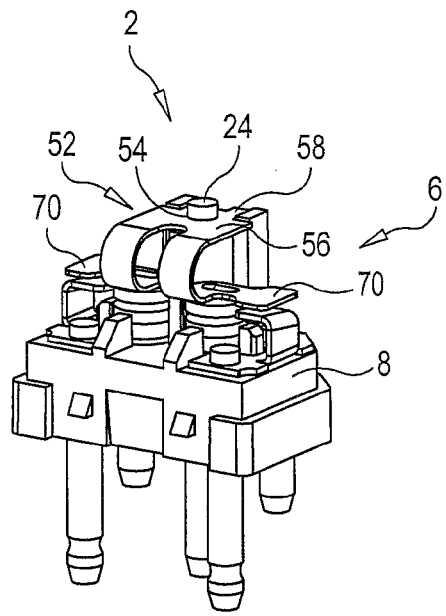
FIG. 5 is a front perspective view of the protector module formed in accordance with the present invention, showing movable shorting contacts added to the assembly shown in FIG. 4.
Figure 5A:
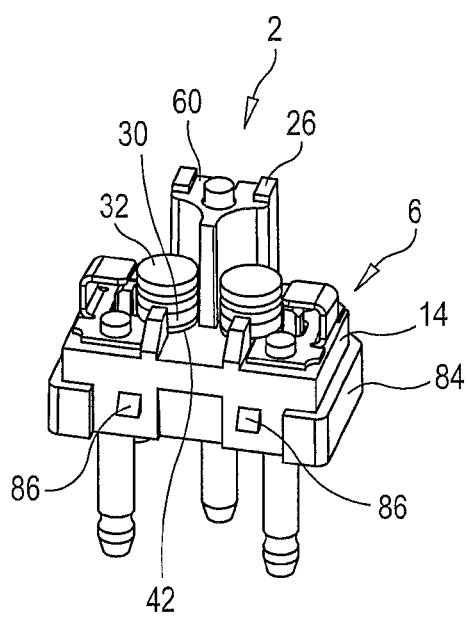
FIG. 5A is a front perspective view of the protector module formed in accordance with the present invention, showing solid state devices stacked on top of the solder pellets.
Figure 6A:
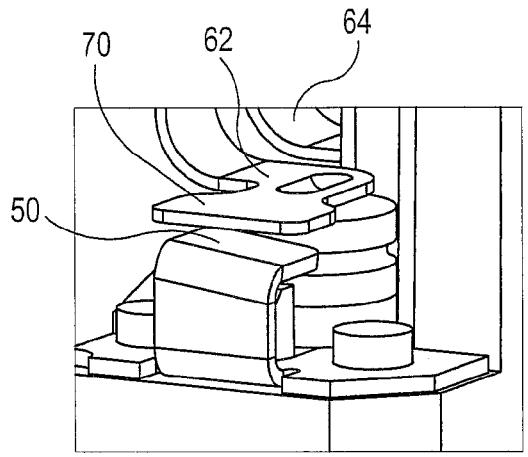
FIG. 6A is an enlarged side perspective view of the protector module formed in accordance with the present invention, showing the movable shorting contacts and angled top surface of the fixed rectangular contacts.
Figure 6B:
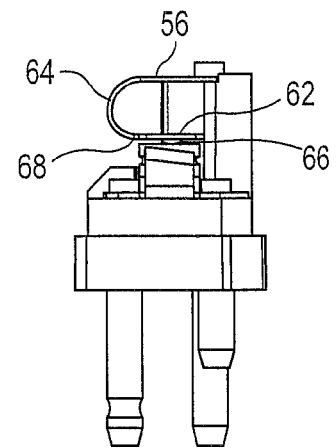
FIG. 6B is an enlarged side view of the protector module formed in accordance with the present invention, showing the movable shorting contacts and angled top surface of the fixed rectangular contacts.

Referring now to FIGS. 5, 6A and 6B of the drawings, it will be seen that the movable shorting contact 52 is preferably formed from one piece of electrically conductive material bent in a U-shape as a resilient leaf spring contact having second lower ends 62 and a first upper end 56 overlying portions of the second lower ends 62. The movable shorting contact 52 includes an opening 54 formed on the first upper end 56 thereof that receives therethrough and makes electrical contact with the upper end of the ground conductor pin 24 extending from the ground conductor support 20. The first end 56 of the movable shorting contact 52 further includes a rectangularly shaped tab 58 extending therefrom that may be fitted within a correspondingly shaped recess 60 formed in the top surface 26 of the ground conductor support 20, securing the movable shorting contact 52 therein.

Referring to FIGS. 6A and 6B of the drawings, it will be seen that the second end 62 of the movable shorting contact 52, interconnected with the first end 56 by a curved portion 64 extending therebetween, includes a pair of laterally outwardly extending, downwardly convexly-shaped contact portions 66 extending from a bottom surface 68 thereof that are in electrical communication with the top contact surfaces of the solid state devices 32. The curved portion 64 of the movable shorting contact 52 is preferably resilient to downwardly bias the second end 62, and convex contact portions 66, against the solid state devices 32. Extending outwardly from the convex contact portion 66 of each second end 62 of the movable shorting contact 52 is a free end tab contact 70. The free end tab contacts 70 are positioned above the angled top surfaces 50 of the upper contact portions 44 of the fixed contacts 38.

During a prolonged power surge, after the solder pellets 30 supporting the solid state devices 32 melt and flow into the wells 34 in the base member 8, the resilient curved portion 64 downwardly biases the second end 62 of the movable shorting contact 52, and the free end tab contacts 70 extending therefrom, against the angled top surfaces 50 of the upper contact portions 44 of the fixed contacts 38, shorting the tip and ring pairs 18 in electrical communication thereto to ground through ground conductor pin 24.

As can be seen in FIGS. 6A and 6B of the drawings, in a normal state, the free end tab contacts 70 are raised above and not in contact with the angled top surfaces 50 of the upper contact portions 44 of the fixed contacts 38. The free end tab contacts 70 are maintained in this raised position against the downward bias of the resiliently movable shorting contacts 52 by the combined thicknesses of the solder pellet 30 and solid state device 32 interposed between the lower contact portion 42 of the fixed contacts 38 and the convex contact portion 66 of the movable shorting contacts 52.

In a prolonged surge state during which current flowing through the solid state device 32 and solder pellet 30 causes excessive heat which melts the pellet 30 such that now only the solid state device 32 is interposed between the fixed contact 38 and the movable shorting contact 52, the resilient curved portion 64 biases the second end 62 downwardly at the same angle in which the top surfaces 50 of the fixed contacts 38 reside so that the bottom surface of free end tab contacts 70 of the movable shorting contacts 52 rests against and electrically contacts the corresponding full top surface 70 of the fixed contacts 38, thereby maximizing the surface contact therebetween for more effectively shorting the tip and ring communication lines to ground through the ground conductor pin 24. Preferably, the top surfaces 50 of the fixed contacts 38 are sloped downwardly relative to the plane in which the lower contact portion 42, which rests on the top surface of the base member 8, resides, at an angle of preferably between about two degrees and about ten degrees, and more preferably about six degrees. Of course, the angle of inclination of the top surface 50 of the fixed contacts 38 is selected depending on the relative angle of movement of the free end tab contacts 70 of the movable shorting contacts 52 so that substantially the full bottom surface of the tab contacts 70 may rest against, and come in contact with, substantially the full top surface 70 of the fixed contacts 38.

More specifically, in a normal state, the free end tab contacts 70 are separated from the angled top surfaces 50 of the upper contact portions 44 as the second end 62 of the movable shorting contact 52 is supported against the bias of the resilient curved portion 64 by the solder pellets 30 and solid state devices 32 stacked thereon. The solid state devices 32 fire (i.e., drop to a low resistance state) first during a power surge and permit current flow between the convex contact portions 66 extending from the bottom surface 68 of the second end 62 and the curved lower contact portion 42 of the fixed contacts 38 on which the solder pellet 30 is positioned. In a surge state, when the voltage between the movable shorting contact 52 and the fixed rectangular contacts 38 exceeds a threshold value for a prolonged period of time, current flowing between the movable shorting contact 52 and the lower contact 38, and through the solid state device 32 and solder pellet 30, causes the solder pellet 30 to melt. The melted solder flows into the wells 34 in the base member 8, and the resilient curved portion 64, now unrestrained, biases the free end tab contacts 70 against the angled top surfaces 50 of the upper contact portions 44 of the fixed contacts 38, shorting the ring and tip conductor pairs 18 with the movable contact 52 and ground conductor pin 24 in electrical communication therewith.

Figure 4:
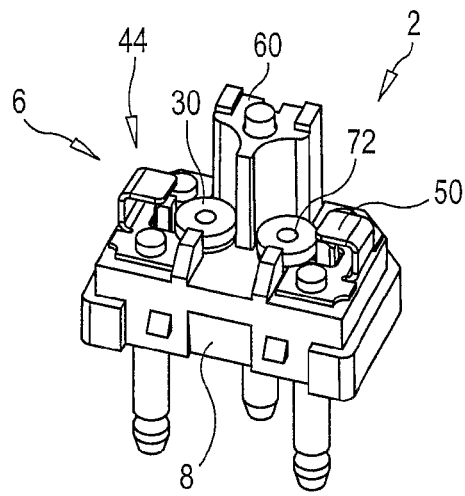
FIG. 4 is a front perspective view of the protector module formed in accordance with the present invention, showing solder pellets added to the rectangular contacts on the base member.

Referring to FIG. 4 of the drawings, the solder pellets 30 are selected based upon a desired melting temperature and further preferably include a bore 72 formed through the centers thereof, the bores 72 being aligned with the wells 34 in the base member 8 to facilitate the direction of flow of the melted solder into the wells 34. The center hole in the solder pellet causes the pellet to melt quicker and creates a better solder flow as it melts inward and into the cavity in the base for better dispersion. The solid state devices 32 are also selected based upon a desired maximum threshold voltage. More specifically, the solid state devices 32 conduct when a selected threshold voltage on the tip or ring line has been reached. Accordingly, a specific solid state device 32 may be selected to prevent against a particular level of power surge. Once the threshold voltage has been reached, the solid state device 32 fires (i.e., conducts) to allow the flow of current through the solder pellet 30 which, as a fail safe measure for prolonged power surges that could cause the solid state device 32 to fail, melts, causing the ring and tip conductor pairs 18 to permanently short to ground through ground conductor pin 24.

Preferably, the solid state device 32 is a thyristor or other crowbar device or diode, sometimes referred to by the name Sidactor™. For example, Part No. 62018 manufactured by Porta Systems Corp. of Syosset, N.Y., now Tii Network Technologies, Inc. of Edgewood, N.Y., is a 240 volt semiconductor which may be used for solid state device 32. Alternative devices which may be used for solid state device 32 include Part No. 2EL4 manufactured by Bourns, Inc. of Riverside, Calif. or Part No. P-T100-2400BC manufactured by Littlefuse, Inc. of Chicago, Ill.

Figure 7:
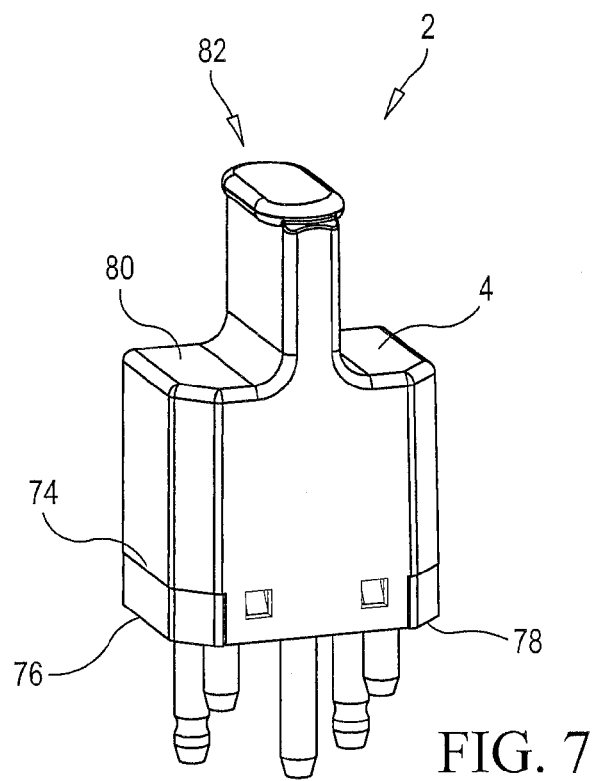
FIG. 7 is a front perspective view of the protector module formed in accordance with a first embodiment of the present invention, showing a protective housing into which the assembled base member is partially received.
Figure 8:
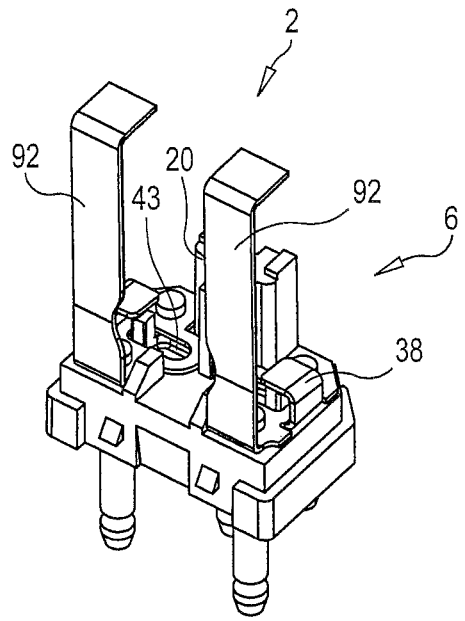
FIG. 8 is a front perspective view of the protector module formed in accordance with a second embodiment of the present invention, showing test contacts extending from the fixed rectangular contacts.

As shown in FIG. 7 of the drawings, the housing 4 includes a cavity defined by an outer surface 74 thereof. The outer surface 74 further includes a bottom surface 76 that defines an open bottom end 78. The open bottom end 78 is correspondingly shaped to the outer dimensions of the base member 8 so that the base member 8 may be inserted therethrough and at least partially into the cavity of the housing 4. The housing 4 further includes a top surface 80, the top surface 80 being oriented opposite the bottom surface 76, the top surface 80 further including a handle or protrusion 82 extending outwardly therefrom for the technician to grasp when inserting or removing the protector module from a connection block. Also, the handle or protrusion 82 may provide sufficient space in which the ground conductor support 20 extending from the base member 8 may be received when the base member 8 is inserted into the housing 4, in order to provide the protector module with a relatively low profile.

Referring again to FIG. 5A of the drawings, it will be seen that the base member 8 further includes a flange 84 extending outwardly from its outer sidewall 14, the flange 84 at least partially surrounding the base member 8. The outer sidewall 14 of the base member 8 further preferably includes a plurality of interlocking tabs 86 that may be engaged with a plurality of corresponding recesses or slots 88 formed within a lower portion 90 of the housing 4. More specifically, the base member 8 is inserted through the open bottom end 78 of the housing 4, and the interlocking tabs 86 engage the corresponding recesses 88 in the lower portion 90 of the housing 4, securing the bottom surface 76 of the housing 4 with the flange 84 of the base member 8, and encapsulating or at least partially enclosing the base member 8 and other components of the protector module assembly 6 within the housing 4.

Figure 9:
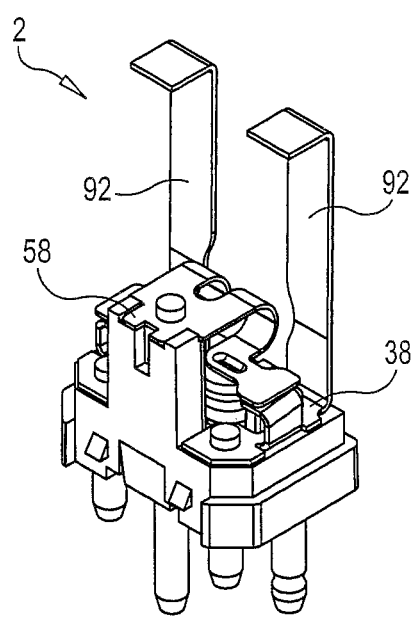
FIG. 9 is a side perspective view of the protector module formed in accordance with the second embodiment of the present invention, showing the protector module assembly and test contacts extending from the fixed rectangular contacts.
Figure 10:
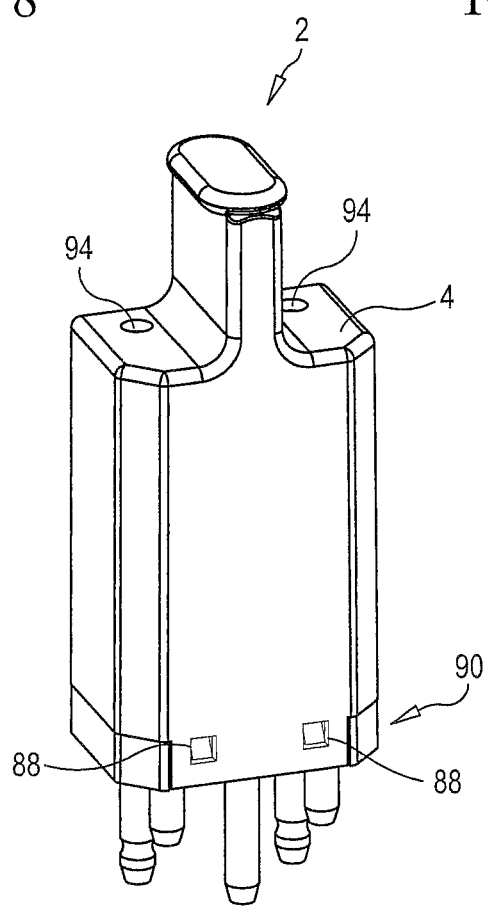
FIG. 10 is a front perspective view of the protector module formed in accordance with the second embodiment of the present invention, showing a housing into which the assembled base member is partially received.

In a second embodiment of the present invention, as shown in FIGS. 9 and 10 of the drawings, a plurality of L-shaped test contacts 92, preferably two, extend upwardly from the fixed rectangular contacts 38 in communication with the tip and ring conductor pairs 18. A plurality of openings 94 are formed through the top surface 80 of the housing 4 and are aligned with the test contacts 92 extending upwardly from the rectangular contacts 38 to allow a user to have access to the test contacts 92 and the tip and ring communication lines connected thereto by using a test probe. To accommodate the length of the test contacts 92, the height of the housing 4 is increased, as shown in FIG. 10.

FIGS. 11A-11I and 12A-12I of the drawings show various views of the second and first embodiments, respectively, of the protector module of the present invention described previously and shown in FIGS. 1-10.

Figure 13:
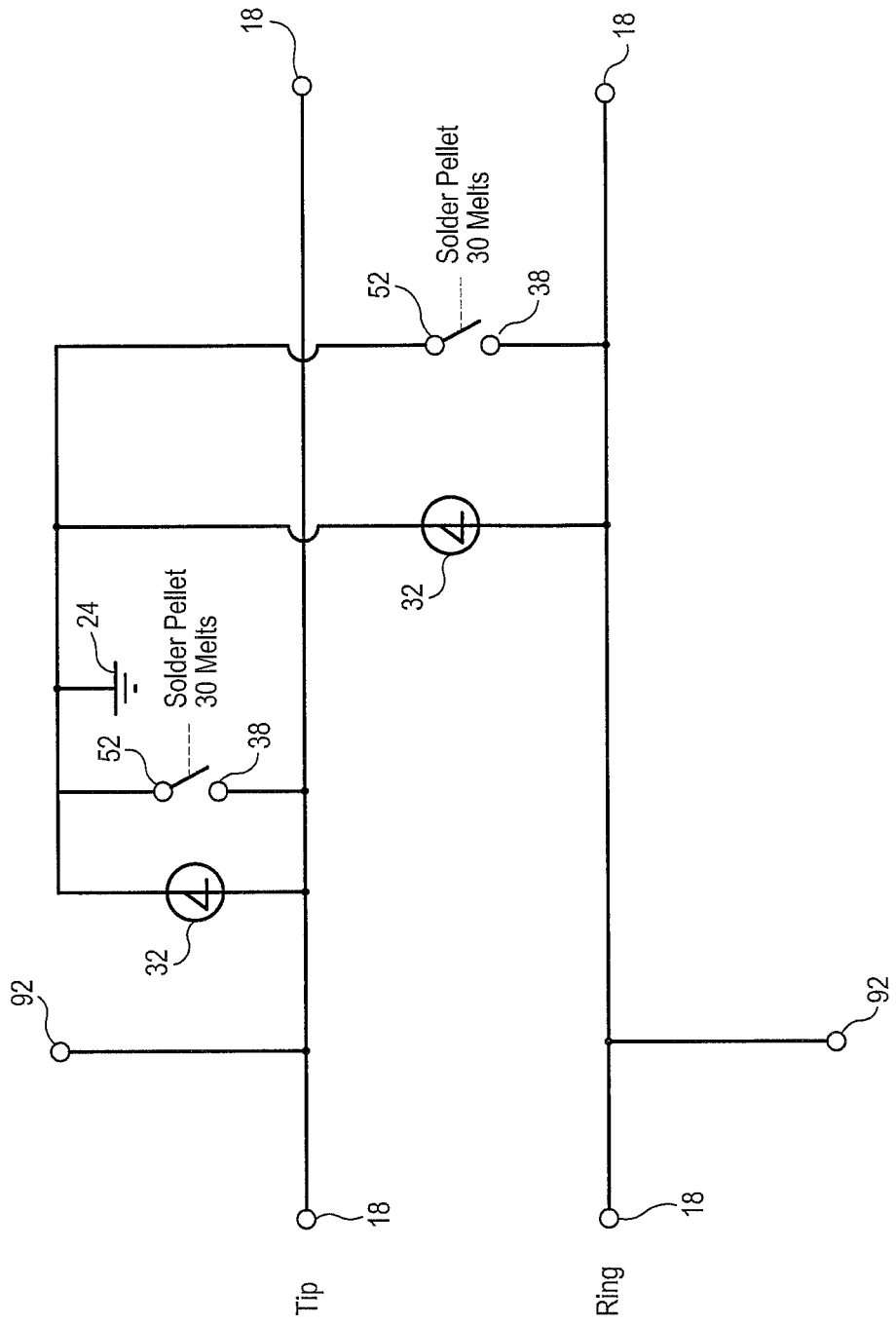
FIG. 13 is a schematic diagram of the electrical circuit of the protector module formed in accordance with the present invention.

FIG. 13 is a schematic diagram of the protector module of the present invention formed in accordance with the second embodiment thereof having test contacts 92. Communication signals on the tip and ring lines connected to pin pairs 18 pass through respective fixed contacts 38 mounted on the top surface 10 of the base member 8 and joined to the tip and ring pair of conductor pins. A solid state device 32, as described previously, is in electrical communication with each of the tip fixed contact 38 and the ring fixed contact 38 through the solder pellet 30, and to ground through ground conductor pin 24.

When a surge occurs on either the tip line or the ring line, the corresponding semiconductor device 32 conducts current therethrough and through the solder pellet 30, and effectively shorts the tip fixed contact 38 or the ring fixed contact 38 to ground through the ground conductor pin 24. If the surge is prolonged, and as a fail safe measure, the solder pellet 30 melts, and the movable contact 52 mechanically and electrically contacts the tip fixed contact 38 or the ring fixed contact 38, or both, to shunt current therethrough to ground through ground conductor pin 24. Thus, schematically, the movable contacts 52 and the tip and ring fixed contacts 38 are depicted in FIG. 13 as single pole, single throw switches arranged in parallel with the solid state devices 32 to bypass current flowing through the solid state devices 32 to ground and which are activated when the solder pellets 30 melt.

Test contacts 92 are shown schematically in FIG. 13 as being connected to the tip fixed contact 38 and the ring fixed contact 38, in accordance with the second embodiment of the protector module of the present invention. Such test contacts 92 would be omitted in the first embodiment of the protector module of the present invention.

To summarize some of the features of the present invention, a protector module 2 constructed in accordance with the present invention is useable with a communication system, such as a telephone system having tip lines and ring lines. Such a protector module includes a base member 8, the base member 8 having a top surface 10 and a bottom surface 12 situated opposite the top surface 10, and a plurality of electrically conductive pins 18, 24 mounted on the base member 8 and extending outwardly from the bottom surface 12 thereof. The plurality of electrically conductive pins 18, 24 include a communication system line pin 18, which may be connected to the tip line or ring line, for example, of a telephone system, and a ground pin 24.

The protector module 2 further includes a first electrical contact 38 fixedly mounted on the top surface 10 of the base member 8, the first electrical contact 38 being in electrical communication with either the communication system line pin 18 (for example, the tip line pin or the ring line pin) or the ground pin 24.

The protector module 2 further includes a second electrical contact 52 situated at least partially above and in alignment with the first electrical contact 38. The second electrical contact 52 is in electrical communication with the other of the communication system line pin 18 or the ground pin 24. Furthermore, the second electrical contact 52 is movable between a first position in which the second electrical contact 52 is not in electrical communication with the first electrical contact 38, and a second position in which the second electrical contact 52 is in electrical communication with the first electrical contact 38.

The protector module 2 of the present invention further includes a solid state device 32. The solid state device 32 is positioned between the first electrical contact 38 and the second electrical contact 52. The protector module 2 also includes a solder pellet 30.

The solder pellet 30 is positioned between the first electrical contact 38 and the second electrical contact 52 and further is situated in proximity to the solid state device 32. The solder pellet 30 and the solid state device 32 together are interposed between the first electrical contact 38 and the second electrical contact 52.

The solder pellet 30 of the protector module 2 is changeable from an unmelted, solid state to a melted, flowable state. The solder pellet 30, when in the unmelted, solid state, together with the solid state device 32, biases the second electrical contact 52 in the first position, where the second electrical contact 52 is not in electrical communication with the first electrical contact 38. The second electrical contact 52 is in electrical communication with the first electrical contact 38 when the solder pellet 30 is in the melted, flowable state.

In a preferred form of the protector module 2 of the present invention, the top surface 10 of the base member 8 has formed therein a well 34. The well 34 is situated in alignment with the solder pellet 30 so that the well 34 receives solder from the solder pellet 30 when the solder pellet is in the melted, flowable state.

Preferably, the first electrical contact 38 of the protector module 2 includes a first portion 42 thereof which at least partially surrounds the well 34 formed in the top surface 10 of the base member 8. The solder pellet 30, when in the solid, unmelted state, rests on the first portion 42 of the first electrical contact 38.

Furthermore, the base member 8 of the protector module 2 preferably includes at least one guide member 28, 36 extending outwardly from the top surface 10 of the base member 8. The at least one guide member 28, 36 is provided to facilitate the positioning of at least one of the solder pellet 30 and the solid state device 32 on the top surface 10 of the base member 8.

Additionally, the solder pellet 30 used in the protector module 2 is preferably generally cylindrical in shape and has formed through the thickness thereof a central opening 72, and thus, for example, is donut-shaped.

In another preferred form of the protector module 2 of the present invention, the base member 8 includes a second electrical contact support 20 extending outwardly from the top surface 10 thereof. The second electrical contact 52 is mounted on the support 20. Furthermore, each of the first electrical contact 38 and the second electrical contact 52 includes a contact portion 48, 70, respectively. The contact portion 70 of the second electrical contact 52 overlies and is in close proximity to the contact portion 48 of the first electrical contact 38.

Also, preferably, the second electrical contact support 20 includes a sidewall 28, the sidewall 28 conforming at least partially to the shape of at least one of the solder pellet 30 and the solid state device 32 to facilitate the positioning of the at least one of the solder pellet 30 and the solid state device 32 with respect to the top surface 10 of the base member 8.

In another preferred form of the present invention, the second electrical contact 52 of the protector module 2 is generally U-shaped and includes a mounting portion 56 which is fixedly mounted on the second electrical contact support 20. The second electrical contact 52 also includes the contact portion 70, as mentioned previously, which overlies the contact portion 48 of the first electrical contact 38, and a resilient intermediate portion 64 situated between the mounting portion 56 and the contact portion 70 of the second electrical contact 52. In this embodiment, the contact portion 70 of the second electrical contact 52 physically engages the contact portion 48 of the first electrical contact 38 over a substantial portion of the surface areas of the contact portions 48, 70 of the first and second electrical contacts 38, 52 when the second electrical contact 52 is in the second position.

Furthermore, in a preferred form of the protector module 2, the contact portion 48 of the first electrical contact 38 is raised above the top surface 10 of the base member 8. The raised contact portion 48 of the first electrical contact 38 includes a top surface 50, and the contact portion 70 of the second electrical contact 52 includes a bottom surface. The bottom surface of the contact portion 70 of the second electrical contact 52 overlies and is electrically separated from the top surface 50 of the raised contact portion 48 of the first electrical contact 38 when the second electrical contact 52 is in the first position, and the bottom surface of the contact portion 70 of the second electrical contact 52 is in physical engagement with the top surface 50 of the raised contact portion 48 of the first electrical contact 38 when the second electrical contact 52 is in the second position.

Furthermore, in a preferred form of the protector module 2, the first electrical contact 38 includes a lower portion 42 which substantially resides in a plane and which is mounted on the top surface 10 of the base member 8. The first electrical contact 38 further includes the raised contact portion 48, as mentioned previously, and an intermediate portion 46 which extends between the lower portion 42 and the raised contact portion 48. Preferably, the top surface 50 of the raised contact portion 48 of the first electrical contact 38 is sloped relative to the plane in which the lower portion 42 substantially resides.

The contact portion 70 of the second electrical contact 52 preferably moves in a partial arc when the second electrical contact 52 moves from the first position to the second position. The bottom surface of the contact portion 70 of the second electrical contact 52 engages a substantial portion of the sloped top surface 50 of the contact portion 48 of the first electrical contact 38 when the second electrical contact 52 is in the second position.

Also, as mentioned previously, the protector module 2 of the present invention further includes a protective housing 4 defining an internal cavity. The base member 8 is at least partially enclosed by the protective housing 4 and is at least partially received by the internal cavity of the housing 4. Also, the protector module 2 preferably includes a least one test contact 92. The at least one test contact 92 is electrically in communication with the first electrical contact 38 and extends outwardly from the top surface 10 of the base member 8 and into the internal cavity of the protective housing 4. Furthermore, the protective housing 4 includes at least one opening 94 formed through the thickness thereof, the at least one opening 94 being situated in alignment with at least a portion of the at least one test contact 92.

The protective housing 4 also preferably includes a handle 82 situated on and extending outwardly from the top surface 80 of the protective housing 4.

The advantages of the protector module 2 of the present invention over conventional protector modules are quite numerous. Conventional protector modules employ springs that bias miniature bobbins or spools that are mounted on and soldered to posts. The bobbins are wrapped with wire that conducts current. During a prolonged power surge, current flowing through the wire on the bobbin heats up and melts the solder that holds the bobbins in place on their respective posts against the bias of the springs. The melted solder releases the bobbins to slide downwardly on the posts by the force of the springs, where they cause the tip and ring lines to permanently short to ground through a ground conductor pin.

As may be realized from the above description, such conventional protector modules are quite complex in structure and require several moving parts to function. The protector module 2 of the present invention, on the other hand, is relatively simple in structure, requiring fewer parts overall, and is much easier to assemble than conventional protector modules.

Furthermore, the protector module 2 of the present invention has several features not found in conventional protector modules, including the features mentioned above. For example, and to name a few, such features of the protector module 2 of the present invention include, but are not limited to, a shorting contact 52 which requires less movement to effect a fail safe grounding of the tip and ring lines than in conventional protection modules; the use of a solder pellet 30, and even more specifically, a solder pellet 30 having a donut shape with a central opening 72 formed therethrough to help facilitate the flow of melted solder therefrom in a particular direction; a well 34 formed in the base member 8 of the protector module to receive the melted solder from the pellet 30 and to ensure that the melted solder does not pool on the surface of the base member 8 and possibly interfere with the operation of the protector module; specifically angled contact surfaces 50 on the fixed contacts 38 so that, when the resiliently movable, U-shaped shorting contact 52 expands, the contact surfaces of the movable shorting contacts 52 engage the full surfaces of the fixed contacts 38; and the provision of oval openings 43 fanned in the fixed contacts 38 to help direct the melted solder from the pellets 30 into the wells 34.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A protector module for use with a communication system, which comprises:
    a base member, the base member having a top surface and a bottom surface situated opposite the top surface;
    a plurality of electrically conductive pins mounted on the base member and extending outwardly from the bottom surface thereof, the plurality of electrically conductive pins including a communication system line pin and a ground pin;
    a first electrical contact fixedly mounted on the top surface of the base member, the first electrical contact being in electrical communication with one of the communication system line pin and the ground pin;
    a second electrical contact situated at least partially above and in alignment with the first electrical contact, the second electrical contact being in electrical communication with the other of the communication system line pin and the ground pin, the second electrical contact being movable between a first position in which the second electrical contact is not in electrical communication with the first electrical contact, and a second position in which the second electrical contact is in electrical communication with the first electrical contact;
    a solid state device, the solid state device being positioned between the first electrical contact and the second electrical contact; and
    a solder pellet, the solder pellet being positioned between the first electrical contact and the second electrical contact and further being situated in proximity to the solid state device, the solder pellet and the solid state device together being interposed between the first electrical contact and the second electrical contact, the solder pellet being changeable from an unmelted, solid state to a melted, flowable state, the solid pellet, when in the unmelted, solid state, together with the solid state device, biasing the second electrical contact in the first position, where the second electrical contact is not in electrical communication with the first electrical contact, the second electrical contact being in electrical communication with the first electrical contact when the solder pellet is in the melted, flowable state;
    wherein the base member includes a second electrical contact support extending outwardly from the top surface thereof, the second electrical contact being mounted on the support;
    wherein each of the first electrical contact and the second electrical contact includes a contact portion, the contact portion of the second electrical contact overlying and being in close proximity to the contact portion of the first electrical contact; and
    wherein the second electrical contact is generally U-shaped and includes a mounting portion which is fixedly mounted on the second electrical contact support, the contact portion which overlies the contact portion of the first electrical contact, and a resilient intermediate portion situated between the mounting portion and the contact portion of the second electrical contact.

2. A protector module as defined by claim 1, wherein the top surface of the base member has formed therein a well, the well being situated in alignment with the solder pellet, the well receiving solder from the solder pellet when the solder pellet is in the melted, flowable state.

3. A protector module as defined by claim 2, wherein the first electrical contact includes a first portion thereof which at least partially surrounds the well formed in the top surface of the base member, the solder pellet, when in the solid, unmelted state, resting on the first portion of the first electrical contact.

4. A protector module as defined by claim 1, wherein the base member further includes at least one guide member extending outwardly from the top surface of the base member, the at least one guide member being provided to facilitate the positioning of at least one of the solder pellet and the solid state device on the top surface of the base member.

5. A protector module as defined by claim 1, wherein the solder pellet is generally cylindrical in shape and has formed through the thickness thereof a central opening.

6. A protector module as defined by claim 1, wherein the second electrical contact support includes a sidewall, the sidewall conforming at least partially to the shape of at least one of the solder pellet and the solid state device to facilitate the positioning of the at least one of the solder pellet and the solid state device with respect to the top surface of the base member.

7. A protector module as defined by claim 1, wherein the contact portion of the second electrical contact physically engages the contact portion of the first electrical contact over a substantial portion of the surface areas of the contact portions of the first and second electrical contacts when the second electrical contact is in the second position.

8. A protector module as defined by claim 7, wherein the contact portion of the first electrical contact is raised above the top surface of the base member.

9. A protector module as defined by claim 8, wherein the raised contact portion of the first electrical contact includes a top surface; and wherein the contact portion of the second electrical contact includes a bottom surface, the bottom surface of the contact portion of the second electrical contact overlying and being electrically separated from the top surface of the raised contact portion of the first electrical contact when the second electrical contact is in the first position, the bottom surface of the contact portion of the second electrical contact being in physical engagement with the top surface of the raised contact portion of the first electrical contact when the second electrical contact is in the second position.

10. A protector module as defined by claim 9, wherein the first electrical contact includes a lower portion which substantially resides in a plane and which is mounted on the top surface of the base member, the raised contact portion, and an intermediate portion which extends between the lower portion and the raised contact portion; and wherein the top surface of the raised contact portion of the first electrical contact is sloped relative to the plane in which the lower portion substantially resides.

11. A protector module as defined by claim 10, wherein the contact portion of the second electrical contact moves in a partial arc when the second electrical contact moves from the first position to the second position; and wherein the bottom surface of the contact portion of the second electrical contact engages a substantial portion of the sloped top surface of the contact portion of the first electrical contact when the second electrical contact is in the second position.

12. A protector module as defined by claim 1, which further comprises:
a protective housing defining an internal cavity, the base member being at least partially enclosed by the protective housing and being at least partially received by the internal cavity thereof.

13. A protector module as defined by claim 12, which further comprises:
a least one test contact, the at least one test contact being electrically in communication with the first electrical contact and extending outwardly from the top surface of the base member and into the internal cavity of the protective housing; and wherein the protective housing includes at least one opening formed through the thickness thereof, the at least one opening being situated in alignment with at least a portion of the at least one test contact.

14. A protector module as defined by claim 12, wherein the protective housing includes a top surface, and a handle situated on and extending outwardly from the top surface of the protective housing.

* * * * *